US011690311B2

(12) United States Patent
Sevrey et al.

(10) Patent No.: US 11,690,311 B2
(45) Date of Patent: Jul. 4, 2023

(54) SYSTEMS AND METHODS FOR SPREADING PARTICULATE MATERIAL

(71) Applicant: Earthway Products Inc, Bristol, IN (US)

(72) Inventors: Richard Sevrey, Bristol, IN (US); Justin B. Parizek, Millersburg, IN (US); Casey Martin, South Bend, IN (US); John Marshall, Granger, IN (US); Tim Jones, Osceola, IN (US)

(73) Assignee: Earthway Products, Inc., Bristol, IN (US)

( * ) Notice: Subject to any disclaimer, the term of this patent is extended or adjusted under 35 U.S.C. 154(b) by 640 days.

(21) Appl. No.: 16/719,150

(22) Filed: Dec. 18, 2019

(65) Prior Publication Data

US 2020/0187411 A1 Jun. 18, 2020

Related U.S. Application Data

(60) Provisional application No. 62/781,433, filed on Dec. 18, 2018.

(51) Int. Cl.
*A01C 21/00* (2006.01)
*A01C 7/08* (2006.01)
(Continued)

(52) U.S. Cl.
CPC ............ *A01C 17/001* (2013.01); *A01C 7/085* (2013.01); *A01C 17/008* (2013.01); *A01C 21/00* (2013.01);
(Continued)

(58) Field of Classification Search
CPC ....... A01C 7/085; A01C 17/00; A01C 17/001; A01C 17/006; A01C 17/008; A01C 21/00; E01H 10/007
See application file for complete search history.

(56) References Cited

U.S. PATENT DOCUMENTS

| | | | |
|---|---|---|---|
| 5,203,510 A | | 4/1993 | Courtney et al. |
| 2001/0002036 A1* | | 5/2001 | Nystrom ................ A01C 15/00 239/69 |

(Continued)

FOREIGN PATENT DOCUMENTS

| | | | |
|---|---|---|---|
| EP | 2798930 A2 * | 11/2014 | ........... A01B 79/005 |
| GB | 2100565 A | 12/1981 | |

(Continued)

OTHER PUBLICATIONS

KSAB Utemiljo for aktiva liv, KSAB Duo Super Spreader, DUO Godningsspridare, https://shop.ksabgolf.se/vara-produkter/for-golfbanan/greenkeeperutrustning/ovrigt-underhall/ksab-duo-super-spreader, 2 pages.

(Continued)

*Primary Examiner* — Darren W Gorman
(74) *Attorney, Agent, or Firm* — Hovey Williams LLP; Kameron D. Kelly

(57) ABSTRACT

Systems and methods for managing spreading of particulate material over a surface by a spreader. One step of the method includes receiving a selection of a type of the spreader. An additional step includes receiving a selection of a type of the particulate material to be spread by the spreader. An additional step includes obtaining data indicative of a travel speed of the spreader, with the data being received from a sensor associated with the spreader. An additional step includes determining an operational attribute of the spreader. The determination is based on (i) the type of the spreader, (ii) the type of the particulate material, and (ii) the travel speed of the spreader. A further step includes presenting the operational attribute.

7 Claims, 13 Drawing Sheets

(51) Int. Cl.
*B05B 12/00* (2018.01)
*A01C 17/00* (2006.01)
*E01H 10/00* (2006.01)
*B05B 3/10* (2006.01)

(52) U.S. Cl.
CPC .......... *B05B 3/1057* (2013.01); *B05B 12/002* (2013.01); *E01H 10/007* (2013.01)

(56) References Cited

U.S. PATENT DOCUMENTS

| | | | |
|---|---|---|---|
| 2002/0162907 | A1 | 11/2002 | Courtney |
| 2007/0244605 | A1* | 10/2007 | Hopkins .............. A01D 34/006 701/1 |
| 2014/0088795 | A1* | 3/2014 | Larsen .................. E01H 10/007 701/2 |
| 2016/0106028 | A1 | 4/2016 | Kendall et al. |
| 2020/0120861 | A1* | 4/2020 | Rich ..................... B05B 12/081 |

FOREIGN PATENT DOCUMENTS

| | | | |
|---|---|---|---|
| WO | 2005/107431 | A1 | 11/2005 |
| WO | 2018/156958 | A1 | 8/2018 |

OTHER PUBLICATIONS

Search Report for related Great Britain Patent Application No. GB2000596.3, dated Jul. 15, 2020, 4 pages.

* cited by examiner

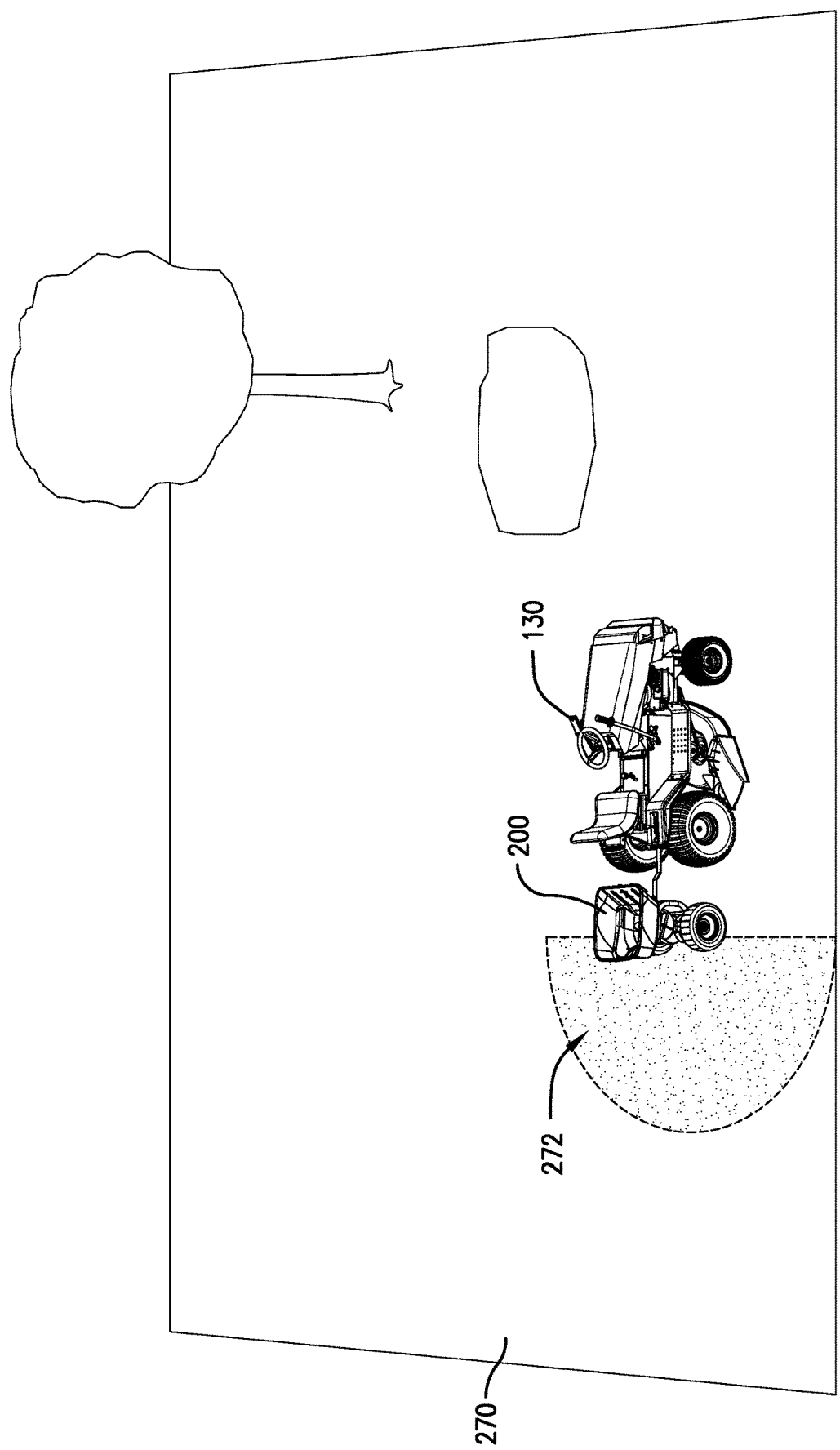

SYSTEMS AND METHODS FOR SPREADING PARTICULATE MATERIAL

CROSS-REFERENCE TO RELATED APPLICATIONS

This application claims the benefit of priority to U.S. Provisional Patent Application Ser. No. 62/781,433, filed Dec. 18, 2018, and entitled "Material Spreader," which is hereby incorporated by reference in its entirety.

TECHNICAL FIELD

Embodiments of the present invention relate to systems and methods for spreading particulate material. In more detail, embodiments of the present invention are directed to systems and methods for managing and monitoring the spreading of particulate material by a implement, such as broadcast spreader.

BACKGROUND OF THE INVENTION

Many different types of implements, such as broadcast spreaders, are used to spread or otherwise distribute particulate material or granules such as fertilizer, grass seed, salt, sand, ice melt, and the like onto surfaces, such as lawns, golf courses, turf, sidewalks, parking lots, and the like. Each of the various types of implements used to spread particulate material have their own unique operational attributes, such as application rates and coverage areas, which makes it difficult to accurately manage operation of the spreader to determine whether the appropriate amount of particulate material is being distributed to appropriate surfaces. Furthermore, operational attributes can be further affected by other implement characteristics, usage characteristics, or settings of the implements, such as for instance the travel speed of the implements, the force at which the implements are spreading particulate material, the type of particulate material being spread by the implements, etc.

There thus remains a need for systems and methods that can accurately and efficiently manage and/or monitor operational attributes, such as application rates and coverage areas, of implements such as broadcast spreaders that are distributing particulate material onto a surface.

BRIEF SUMMARY OF THE INVENTION

The instant invention is generally directed to systems and methods for managing and monitoring the spreading of particulate material over a surface that overcomes the deficiencies of the implements discussed above.

More particularly, some embodiments of the present invention include a spreading system for spreading particulate material. The spreading system comprising a spreader and a mobile device removably secured to the spreader. The spreader includes a frame and a hopper supported by the frame and configured to hold the particulate material. The spreader additionally includes at least one impeller secured underneath the hopper and configured to receive the particulate material from the hopper. The impeller is further configured to rotate to spread the particulate material over a surface. The spreader additionally includes at least one wheel rotatably connected to the frame via an axle and configured to roll along the surface. The spreader further includes a sensor configured to generate an indication of a travel speed of the spreader. The mobile device is configured to receive a selection of a type of the spreader. The mobile device is additionally configured to receive a selection of a type of the particulate material. The mobile device is additionally configured to communicatively couple with the sensor and receive data indicative of the travel speed of the spreader. The mobile device is additionally configured to determine an operational attribute of the spreader, with such determination being based on (i) the type of the spreader, (ii) the type of the particulate material, and (ii) the travel speed of the spreader. The mobile device is further configured to present the operational attribute.

Additional embodiments of the present invention include a computer-implemented method for managing spreading of particulate material over a surface by a spreader. One step of the method includes receiving a selection of a type of the spreader. An additional step includes receiving a selection of a type of the particulate material to be spread by the spreader. An additional step includes obtaining data indicative of a travel speed of the spreader, with the data being received from a sensor associated with the spreader. An additional step includes determining an operational attribute of the spreader. The determination is based on (i) the type of the spreader, (ii) the type of the particulate material, and (ii) the travel speed of the spreader. A further step includes presenting the operational attribute.

Still other embodiments of the present invention include a non-transitory computer-readable media with a computer program stored thereon for managing spreading of particulate material over a surface by a spreader. When executed by one or more processors, the computer program instructs the one or more processors to perform a number of steps. One step includes receiving a selection of a type of the spreader. An additional step includes receiving a selection of a type of the particulate material to be spread by the spreader. An additional step includes obtaining data indicative of a travel speed of the spreader, with the data being obtained from a sensor associated with the spreader. An additional step includes determining an operational attribute of the spreader. The determination is based on (i) the type of the spreader, (ii) the type of the particulate material, and (ii) the travel speed of the spreader. A further step includes presenting the operational attribute.

Still other embodiments of the present invention include a spreading system for spreading particulate material. The spreading system comprises a spreader including a hopper configured to hold the particulate material. The spreader additionally includes at least one impeller configured to receive the particulate material from the hopper and to rotate to spread the particulate material over a surface. The spreading system additionally includes a sensor configured to obtain information relevant to operation of said spreader. The spreading system further induces a mobile device. The mobile device is configured to receive a selection of a type of the spreader. The mobile device is additionally configured to receive a selection of a type of the particulate material. The mobile device is additionally configured to communicatively couple with the sensor and receive the information relevant to operation of said spreader. The mobile device is additionally configured to determine an operational attribute of the spreader. Such determination is based on (i) the type of the spreader, (ii) the type of the particulate material, and (ii) the information received from the sensor. The mobile device is further configured to present the operational attribute.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE SEVERAL VIEWS OF THE DRAWINGS

The present invention is described in detail below with reference to the attached drawing figures, wherein:

FIG. 13 is another illustration of a surface over which a spreader is spreading particulate material, particularly showing the spreader being mounted to and propelled by a work vehicle.

Figure 1:
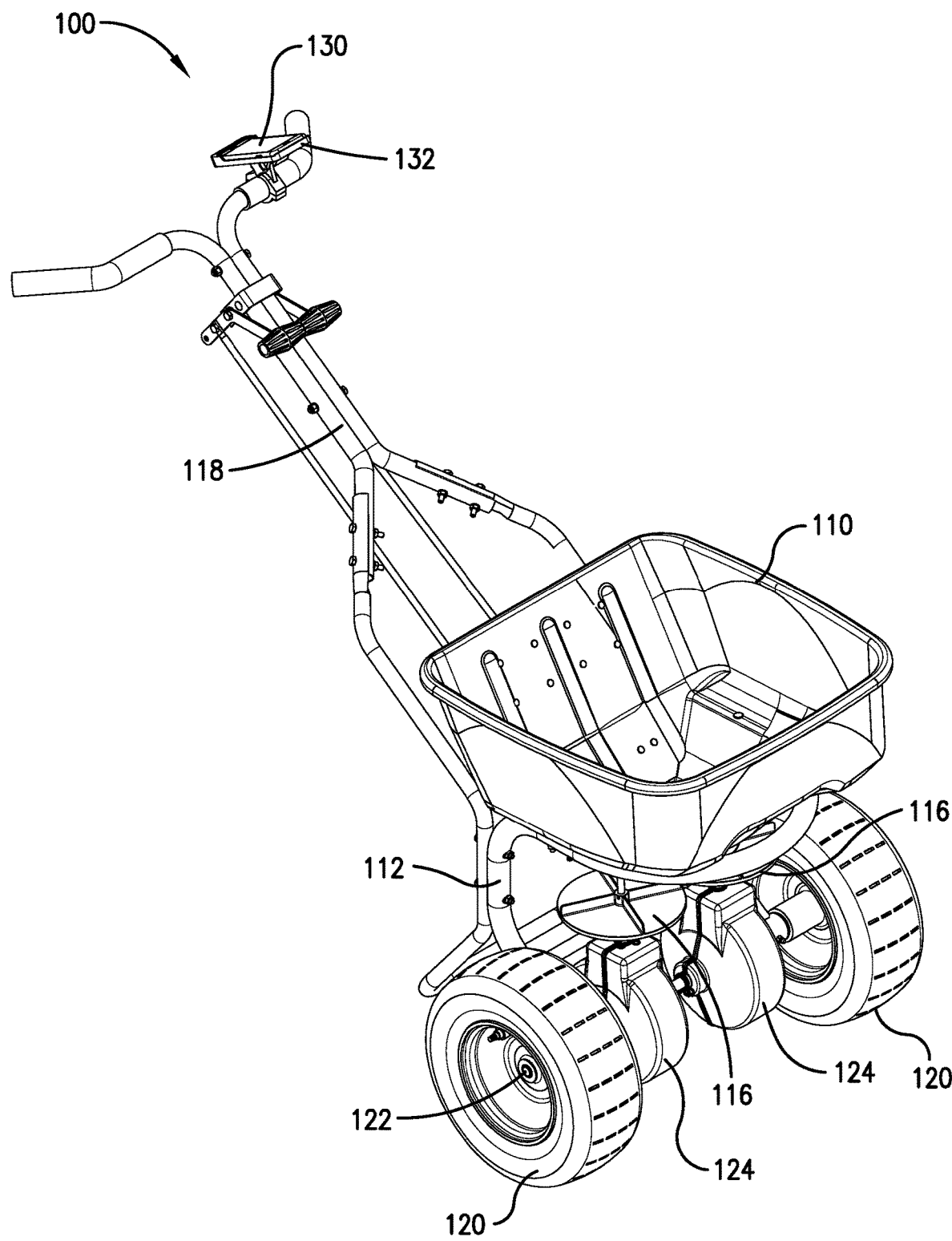
FIG. 1 is a front perspective view of a spreader with a mobile device according to one embodiment of the present invention.
Figure 2:
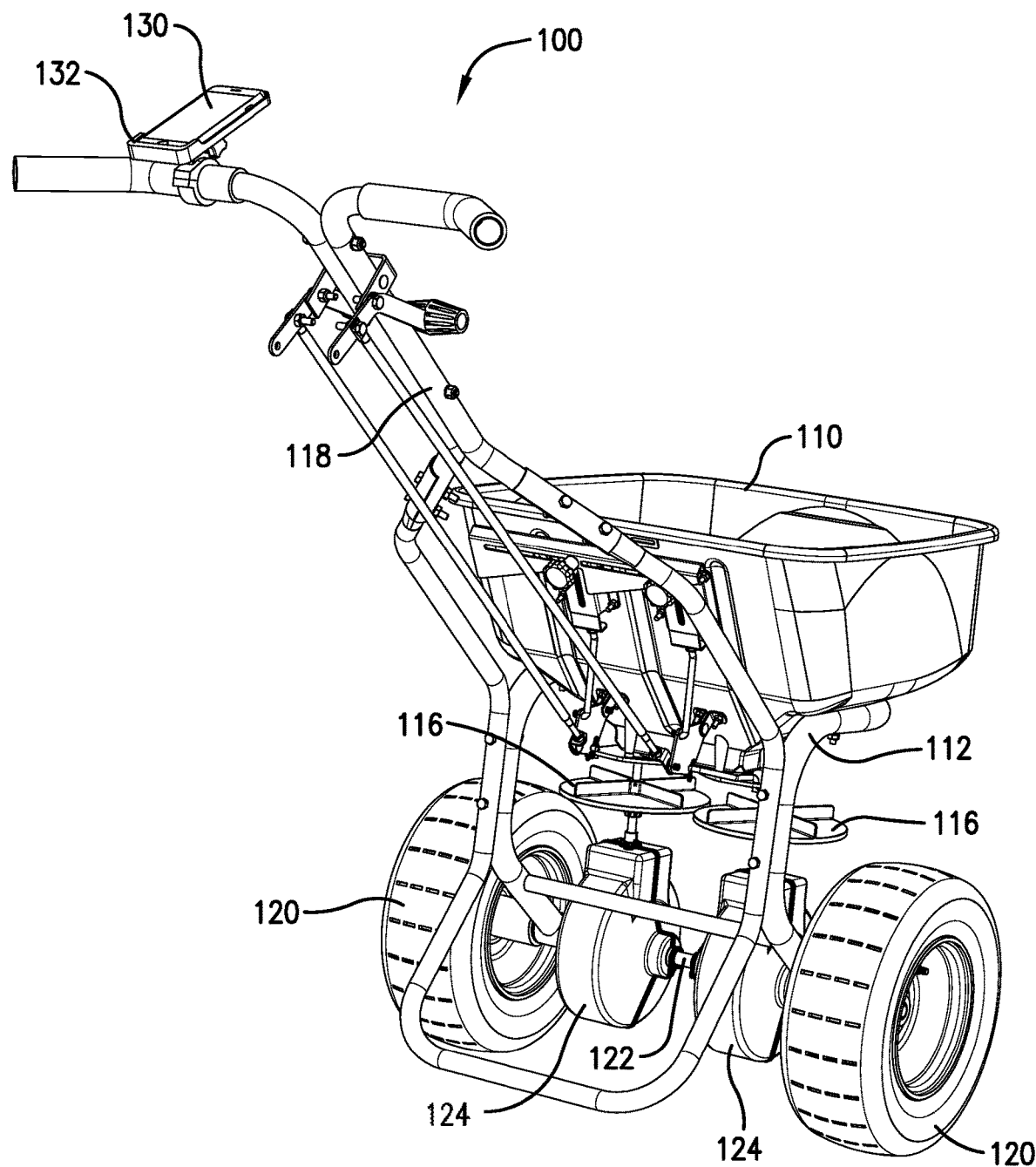
FIG. 2 is a rear perspective view of the spreader and mobile device shown in FIG. 1.
Figure 3:
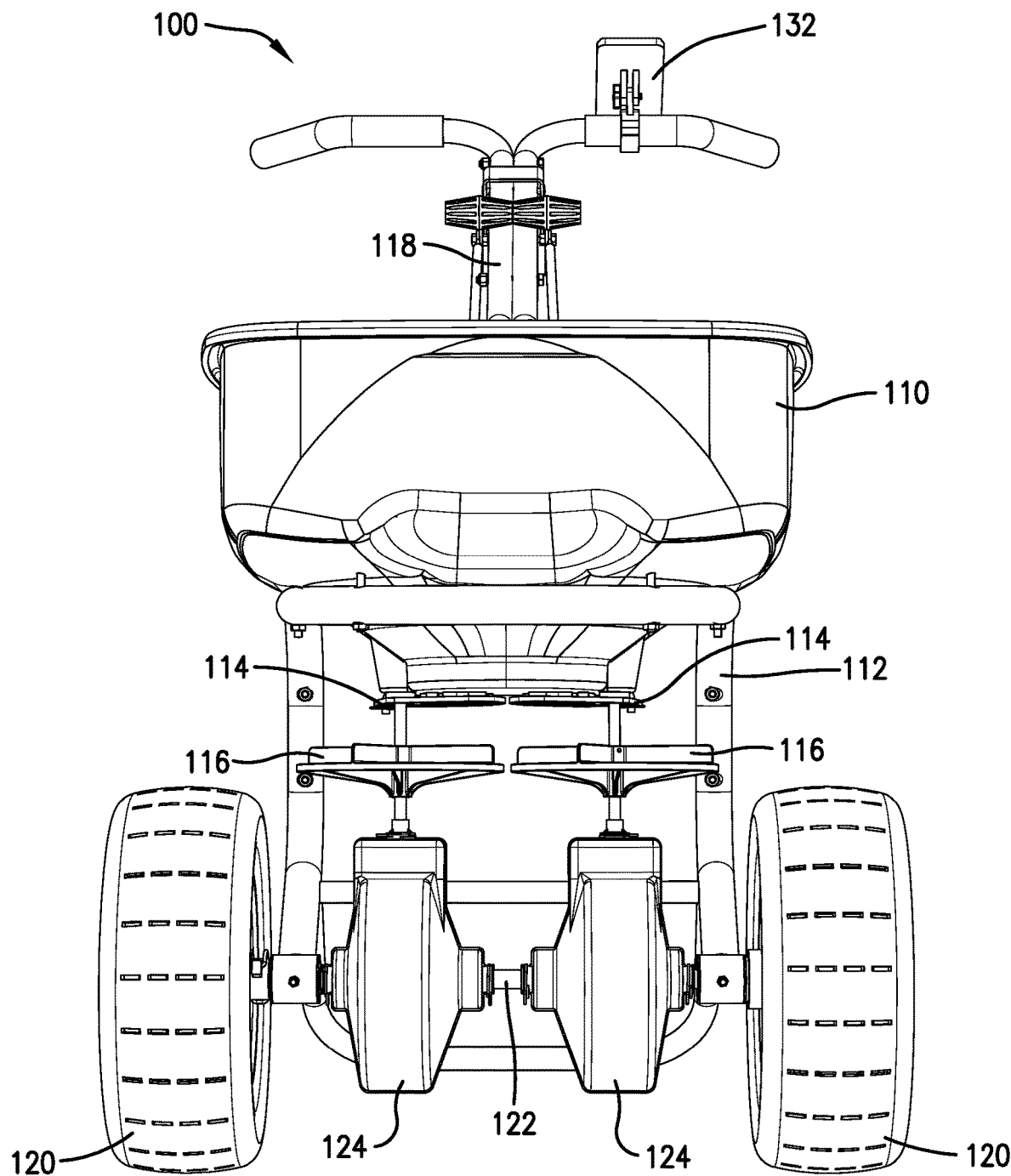
FIG. 3 is a front view of the spreader and mobile device shown in FIGS. 1-2.
Figure 4:
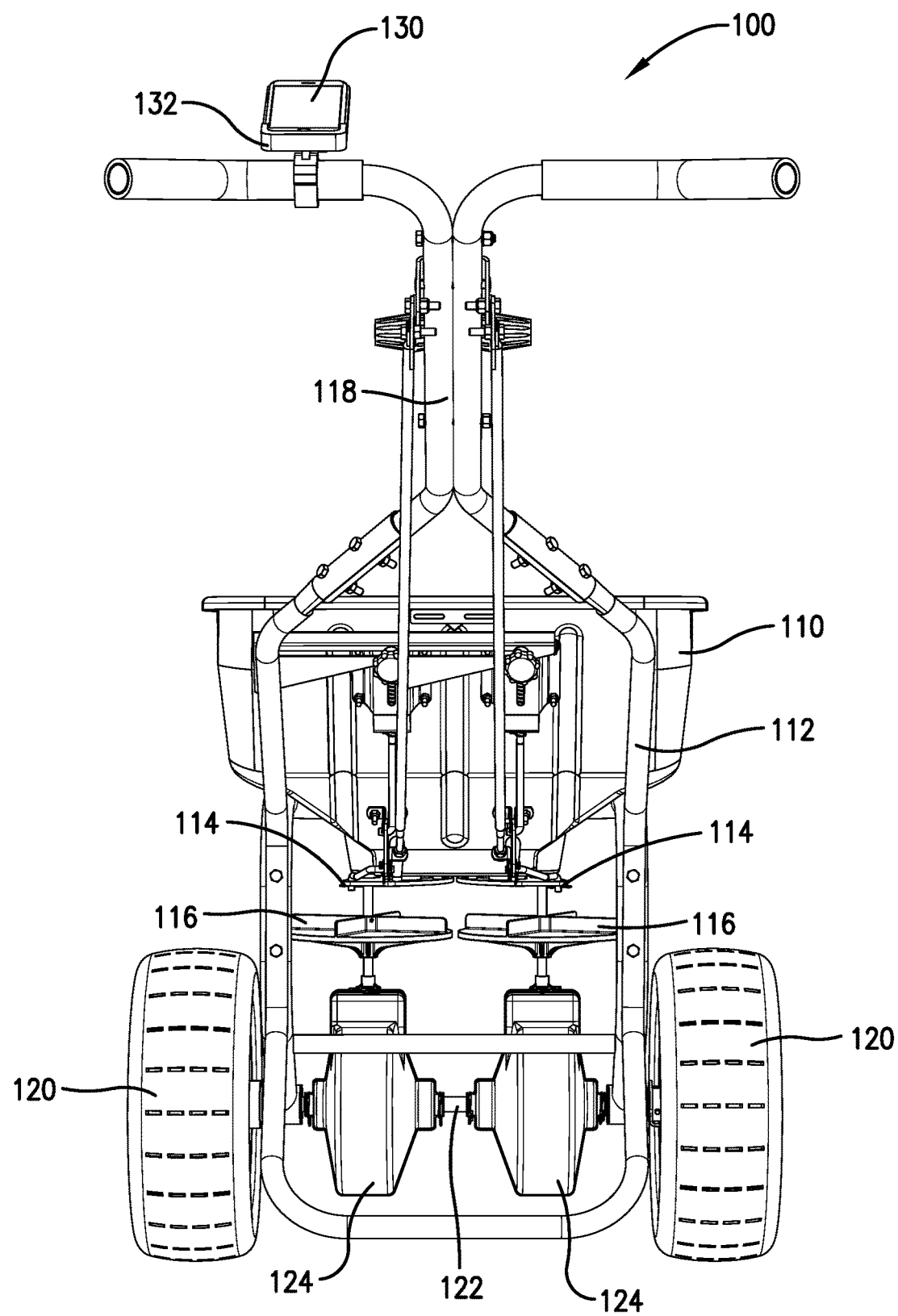
FIG. 4 is rear view of the spreader and mobile device shown in FIGS. 1-3.
Figure 5:
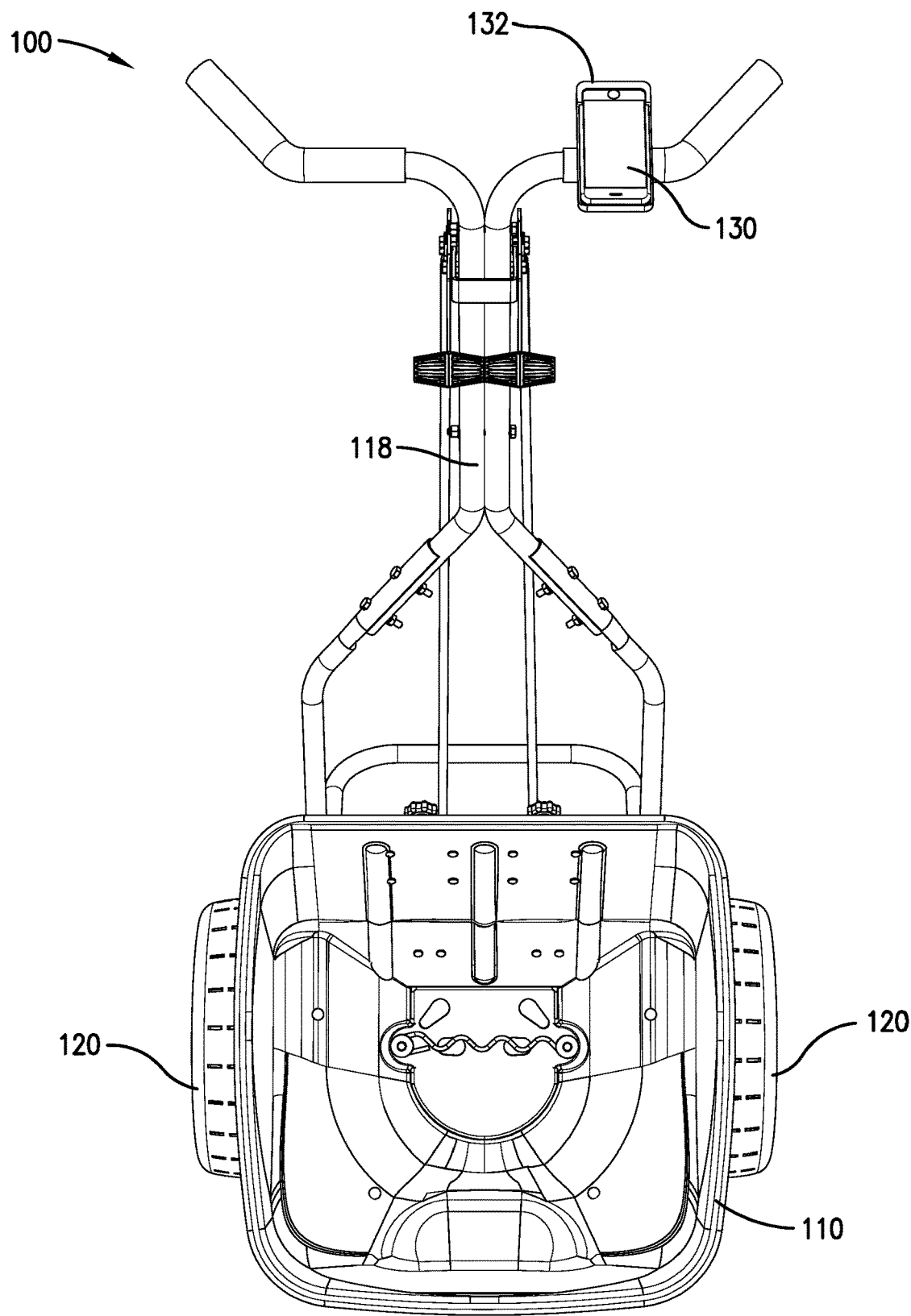
FIG. 5 is a top view of the spreader and mobile device shown in FIGS. 1-4.
Figure 6:
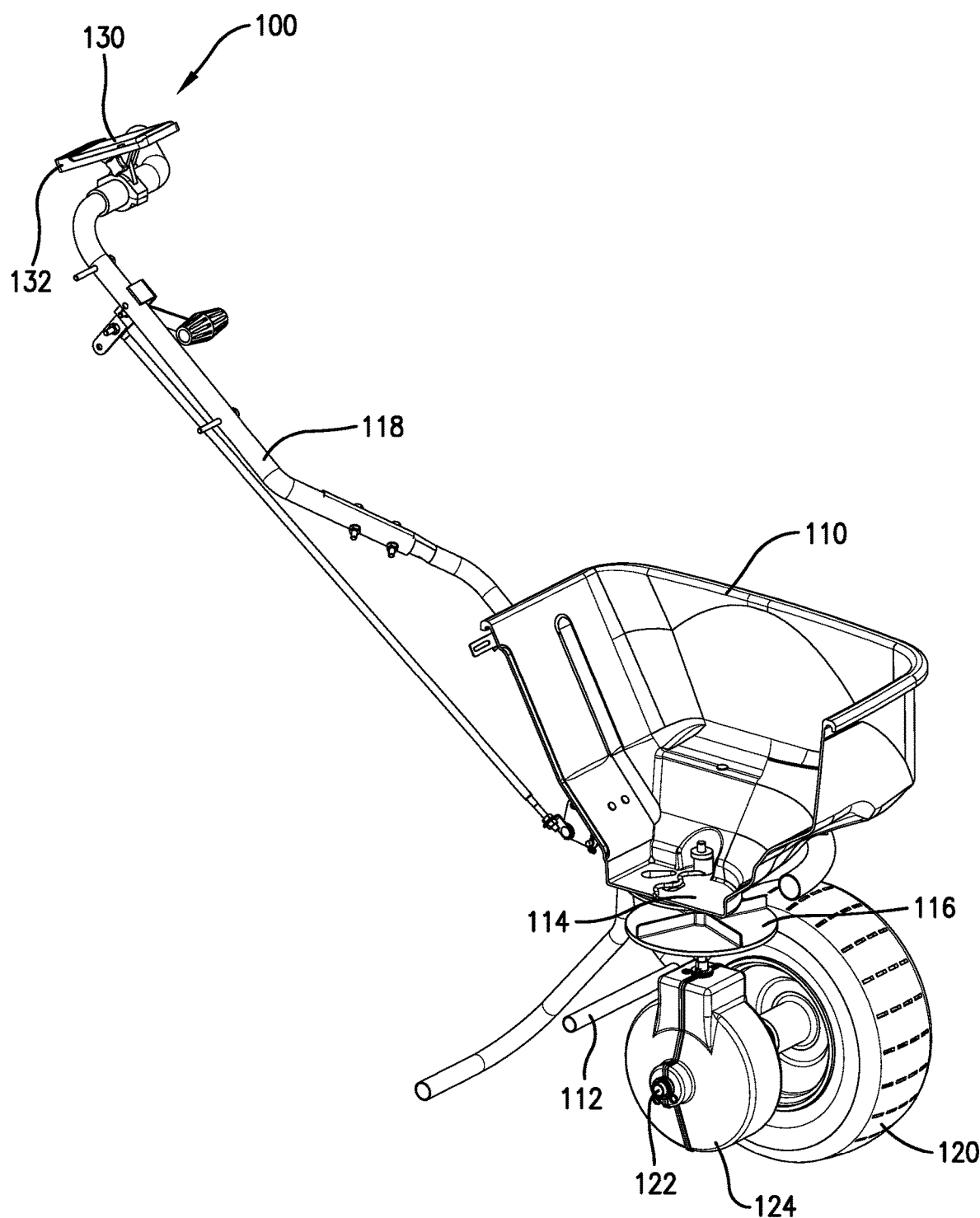
FIG. 6 is a cross-sectional view of the spreader and mobile device shown in FIGS. 1-5.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

At a high level, embodiments of the present invention generally relate to systems and methods for managing and monitoring operational attributes of implements, as such implements distribute particulate material onto a surface. As used herein, the term "operational attributes" means functional abilities and characteristics of an implement as the implement spreads or otherwise distributes particulate material onto a surface. For example, operational attributes may include an application rate of particulate material being distributed over a surface by an implement. An operational attribute may additionally include a coverage area over which particulate material is being distributed over a surface by an implement. Exemplary implements may include broadcast spreaders, such as walk-behind or hand-held spreaders used to distribute granules such as fertilizer, grass seed, and other grass treatments on lawns, golf courses, and other turf, or used to distribute granules such as salt, sand, ice melt, and others on a variety of surfaces. Although the term "spreader" is used throughout the present disclosure as an exemplary implement that distributes particulate material onto a surface, it should be understood that embodiments of the present invention may include and/or be associated with generally any type of implement that distributes particulate material onto a surface.

Beneficially, embodiments of the present invention may incorporate a portable electronic device (i.e., a mobile device) in association with a spreader so as to accurately and efficiently manage and monitor operational attributes of the spreader, such as application rates and coverage areas, as the spreader spreads particulate material over a surface. The mobile device may use data received from one or more data sensors associated with the spreader and/or obtained directly by data sensors or other components of the mobile device. These features will become more readily apparent in the following discussion.

FIGS. 1-6 generally show an implement, in the form of spreader 100, for dispensing particulate material onto a surface. As noted previously, the spreader 100 may be any type of particulate dispersing apparatus capable of dispersing particulate and/or granular material, such as but not limited to lawn seed or fertilizer, salt, sand, ice melt, and other material. The spreader 100 is shown as a walk behind spreader, but in other embodiments the features described herein could be employed on other types of particulate dispersing apparatuses including, for example, a hand-held spreader and a tow-type spreader, among others.

The spreader 100 broadly comprises a hopper 110 supported on the ground by a frame 112. The hopper 110 comprises an open-topped container for holding particulate material. The hopper 110 will include one or more outlet openings (See, e.g., FIG. 5) within a bottom of the hopper 110, with such outlet openings being configured to permit particulate material to drop or fall out of from the hopper 110. The spreader 100 may include one or more shut-off plates 114, as perhaps best shown in FIGS. 3, 4, and 6, positioned below the one or more openings that selectively open and close the outlet openings in the bottom of the hopper 110 so as to permit and to restrict, respectively, the particulate material to fall down, out of the hopper 110. The spreader 100 may further include one or more impellers 116 positioned directly below the shut-off plate that are configured to spin and thus distribute particulate material that falls onto the impellers 116 (i.e., from the outlet openings of the hopper 110) outward away from the spreader as the spreader 100 rolls along a surface. During operation, a user can control distribution of the particulate material from the hopper 110 via a shut-off control that selectively opens and closes the shut-off plates 114, thus permitting or obstructing, respectively, the particulate material from flowing through the outlet openings and onto the impellers 116.

In general, the spreader 100 may be powered by the motion imparted to it by a user pushing the spreader 100 forward or rearward. For example, as illustrated in FIGS. 1-6, the spreader 100 may include a handle 118 that extends upward and rearward from the frame 112 (in some embodiments, the handle 118 may form part of the frame 112), such that a user can grasp an end of the handle 118 for purposes of propelling the spreader 100. In more detail, the spreader 100 may include one or more wheels 120 for rollingly supporting the frame 112 above the ground. In the embodiments shown in the figures, the spreader 100 may include a pair of wheels 120 that rotate about an axle 122 extending generally across a length of the spreader 100. As such, a user can push or pull the spreader 100 by grasping the handle and causing the spreader 100 to roll across a ground surface.

Each of the impellers 116 of the spreader 100 may be operatively connected, via a gear train 124 or the like, to the wheels 120 and/or to the axle 122 of the spreader 100. As a result, as the spreader 100 rolls, the impellers 116 are also caused to turn or spin, thus, flinging and spreading the particulate material (that falls onto the impellers 116 from the hopper 110) over the surface over which the spreader is travelling. Thus, the spreader 100 will spread particulate material over a wider area when the spreader is travelling faster, as compared to when the spreader 100 is travelling relatively slower. Due to the speed and other variables of the spreader 100, it can be difficult to accurately manage and monitor operational attributes, such as application rates and coverage areas, of the spreader 100 as the spreader 100 spreads particulate material onto various surfaces.

To help address such difficulties, embodiments of the present invention may include a mobile electronic device 130 (hereinafter referred to as "mobile device 130," as illustrated in FIGS. 1-6) that can be removably integrated with the spreader 100. Specifically, the handle 118 of the spreader 100 may include a mounting assembly 132, which may be configured as cradle to releasably secure the mobile device 130 to the spreader 100. For example, the mobile device 130 may snap-fit into the mounting assembly 132. In some embodiments, the mobile device 130 may be secured to an upper end of the handle 118 such that a user of the spreader 100 can easily view and manipulate the mobile device 130 while operating the spreader 100. In even further alternatives, the mobile device 130 may be a dedicated computing device that is permanently integrated within the spreader 100 (e.g., permanently mounted within the handle 118).

Figure 7:
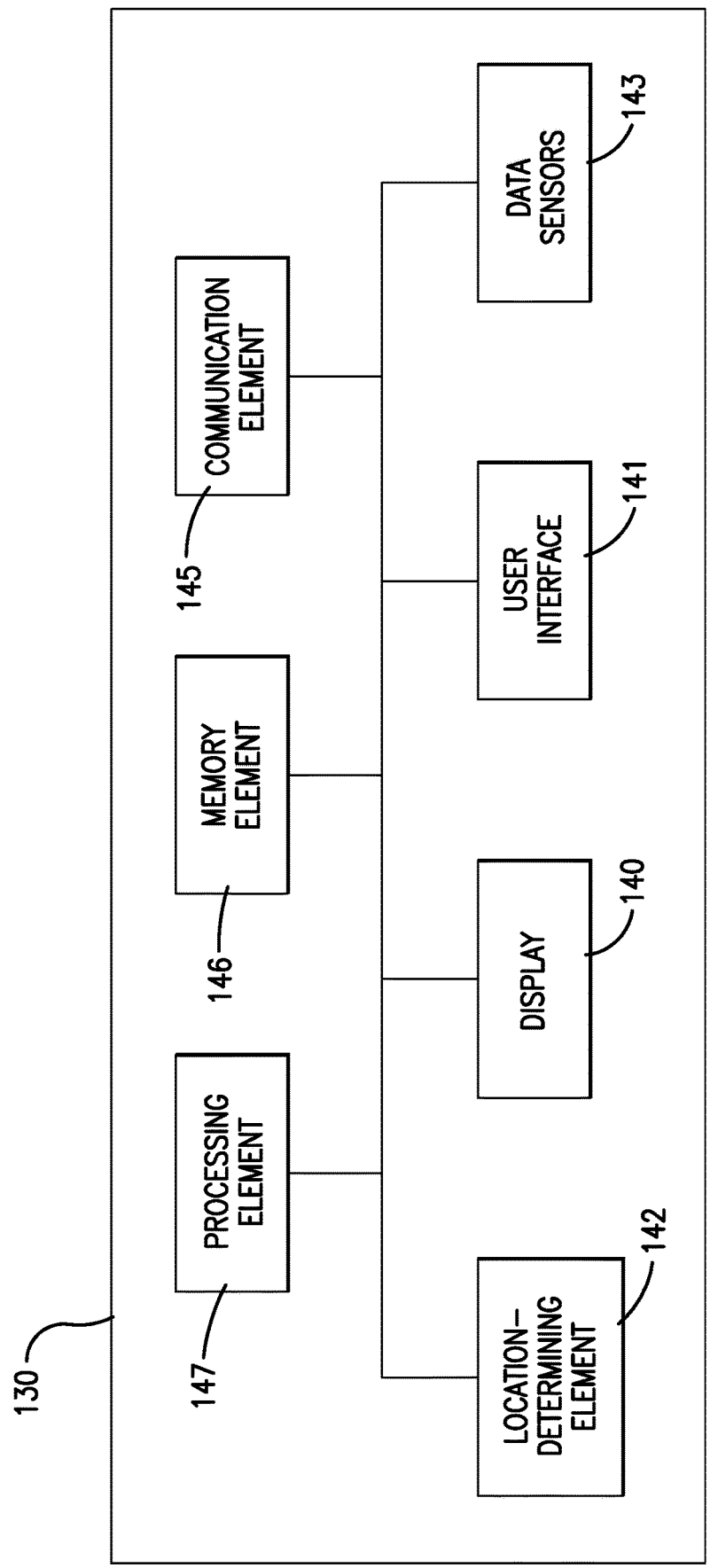
FIG. 7 is a schematic view of an embodiment of the mobile device from FIGS. 1-6.
Figure 8:
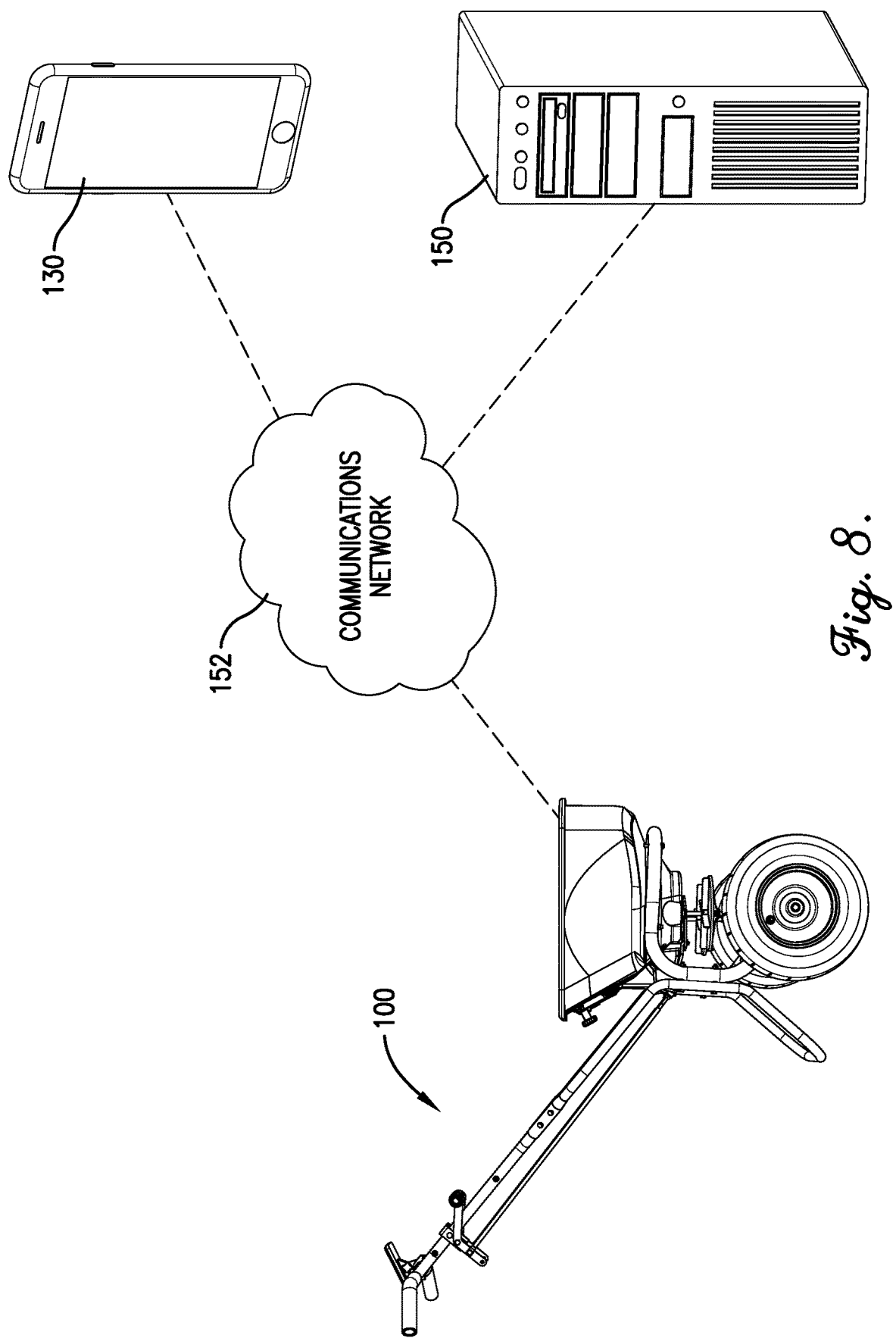
FIG. 8 is a schematic view of an embodiment of a spreading system according to embodiments of the present invention, with the spreading system including the spreader and the mobile device from FIGS. 1-6.

In more detail, the mobile device 130 may comprise generally any type of portable computing device such as a smartphone, a tablet computer, a laptop computer, a phablet, smart glasses, a smartwatch, wearable electronics, or the like, and may, as illustrated in FIG. 7, broadly comprise a display 140, a user interface 141, a location-determining element 142, one or more data sensors 143, a communication elements 145, a memory element 146, and a processing element 147.

The display 140 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 140 may include a screen on which the information is presented, with the screen possessing a square or a rectangular aspect ratio that may be viewed in either a landscape or a portrait mode. In various embodiments, the display 140 may also include a touch screen occupying the entire screen or a portion thereof so that the display 140 functions as part of the user interface 141. The touch screen may allow the user to interact with the mobile device 130 by physically touching, swiping, or gesturing on areas of the display.

The user interface 141 may comprise inputs and outputs to allows a user to interact with the mobile device 130. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, printers, or the like, or combinations thereof. With the user interface 141, the user may be able to control the features and operation of the display 140. For example, the user may be able to zoom in and out on the display 140 using either virtual onscreen buttons or actual pushbuttons. In addition, the user may be able to pan the image on the display 140 either by touching and swiping the screen of the display 140 or by using multidirectional buttons or dials.

The location-determining element 142 generally determines a current geolocation of the mobile device 130 and may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location-determining element 142 may accompany or include an antenna to assist in receiving the satellite signals. The antenna may be a patch antenna, a linear antenna, or any other type of antenna that may be used with location or navigation devices. The location-determining element 142 may include satellite navigation receivers, processors, controllers, other computing devices, or combinations thereof, and memory. The location-determining element 142 may process a signal, referred to herein as a "location signal", from one or more satellites that includes data from which geographic information such as the current geolocation is derived. The current geolocation may include coordinates, such as the latitude and longitude, of the current location of the mobile device 130. The location-determining element 142 may communicate the current geolocation of the mobile device 130 to the processing element 147, the memory element 146, or both.

Although embodiments of the location-determining element 142 may include a satellite navigation receiver, it will be appreciated that other location-determining technology may be used. For example, cellular towers or any customized transmitting radio frequency towers may be used instead of satellites may be used to determine the location of the mobile device 130 by receiving data from at least three transmitting locations and then performing basic triangulation calculations to determine the relative position of the device with respect to the transmitting locations. With such a configuration, any standard geometric triangulation algorithm may be used to determine the location of the mobile electronic device. The location-determining element 142 may also include or be coupled with a pedometer, accelerometer, compass, or other dead-reckoning components which allow it to determine the location of the mobile device 130. The location-determining element 142 may determine the current geographic location through a communications network, such as by using Assisted GPS (A-GPS), or from another electronic device. The location-determining element 142 may even receive location data directly or directly from a user.

The data sensors 143 may generally detect the position, orientation, speed, and acceleration of the mobile device 130 and, thus, the position, orientation, speed, and/or acceleration of the individual or device (e.g., the spreader 100) with which the mobile device 130 is associated. The data sensors 143 may be selected from one or more of the following sensors: (i) accelerometers, (ii) magnetometers, and/or (iii) gyroscopes. The accelerometer may be used to measure linear acceleration relative to a frame of reference, and thus, can be used to detect motion of the mobile device 130 as well as to detect an angle or orientation of the mobile device 130 relative to the horizon or ground surface. By calculating an integral of a measured acceleration with respect to time, embodiments may use data obtained by the accelerometer to measure a velocity of the mobile device 130. Similarly, by calculating a double integral of a measured acceleration with respect to time, embodiments may use data obtained by the accelerometer to measure a displacement distance of the mobile device 130.

The magnetometer may be used as a compass to determine a direction of magnetic north and bearings of the mobile device 130 relative to magnetic north. The gyroscope may be used to detect both vertical and horizontal orientation of the mobile device 130, and together with the accelerometer and magnetometer may be used to obtain accurate information about the orientation of the mobile device 130. In some additional embodiments, the location-determining element 142 may be included as a data sensor 143. Although some embodiments may incorporate the use of one or more of the above-described sensors for the data sensors 143 of the mobile electronic device 130, it should be understood that other sensors may also be used.

The communication element 145 may be configured as one or more transceivers that utilize radio frequency (RF) communication, such as cellular, WiFi, Bluetooth™, or the like, that allow the mobile device 130 to wirelessly communicate with other devices, sensors, systems, or networks. For example, the communication element 145 may include signal or data transmitting and receiving circuits, such as antennas, transceivers, amplifiers, filters, mixers, oscillators, digital signal processors (DSPs), and the like. The communication element may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element may establish communication through connectors or couplers that receive metal conductor wires or cables which are compatible with networking technologies such as ethernet. In certain embodiments, the communication element may also couple with optical fiber cables. As such, in some embodiments, the mobile device 130 may be configured to communicate with other devices, sensors, systems, or networks via a wired connection. The communication element 145 may be in communication with or electronically coupled to memory element 146 and/or processing element 147

The memory element 146 may include one or more electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 146 may be embedded in, or packaged in the same package as, the processing element 147. The memory element 146 may include, or may constitute, a "computer-readable medium." The memory element 146 may store the instructions, code, code segments, software, firmware, computer programs, applications, apps, services, daemons, or the like that are executed by the processing element 147.

The processing element 147 may include one or more electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 147 may generally execute, process, or run instructions, code, code segments, software, firmware, computer programs, applications, apps, processes, services, daemons, or the like. The processing element 147 may also include hardware components such as finite-state machines, sequential and combinational logic, and other electronic circuits that may perform the functions necessary for the operation of the present invention. The processing element 147 may be in communication with the other electronic components through serial or parallel links that include address busses, data busses, control lines, and the like.

Various processes, functions, and features of embodiments of the present invention discussed herein may be performed by the processing element 147 of the mobile device 130 carrying out instructions of a computer program, software, firmware, or combinations thereof stored on the memory element 146. In some embodiments, the computer program may be in the form of a mobile "app."

For instance, the mobile device 130 may be secured to a spreader 100 being used to apply particulate material to a surface. For example, as illustrated in FIGS. 1-6, the mobile device 130 may be releasably secured to the spreader 100 via the mounting assembly 132. As such, the mobile device 130 may be used to manage and monitor the operational attributes of the spreader applying particulate material onto the ground surface over which the spreader is travelling. In more detail, operational attributes, such as the application rates of particulate material being applied to the surface, as well as the coverage area of particulate material being spread onto the surface, will be dependent, at least partly, on a type of the spreader 100 being operated and on the type of particulate material being spread. Embodiments provide for the mobile device 130 to obtain information relevant to the type of spreader 100 being operated by the user. For instance, the mobile device 130 may store information relevant to a variety of different types of spreaders 100 on the memory element 146 of the mobile device 130. Alternatively, information relevant to the variety of different types of spreaders 100 may be stored on an external sever 150 which, as illustrated by FIG. 8, may be connected to the mobile device 130 over a communications network 152.

Broadly, the server 150 may include generally any type of computing device with a communication element, a processing element, and a memory element. As such, the server 150 generally retains electronic data and may respond to requests to retrieve data as well as to store data. In some embodiments, the server 150 may also perform certain of the processes, functions, and features described herein with respect to managing and monitoring the spreading of particulate material by executing portions, or the entirety, of the computer program and/or software of embodiments of the present invention. In more detail, the server 150 may be embodied by a personal computer such as a desktop workstation and/or laptop computer, and/or by application servers, database servers, file servers, gaming servers, mail servers, print servers, web servers, or the like, or combinations thereof. Furthermore, the server 150 may include a plurality of servers, virtual servers, or combinations thereof. The server 150 may be configured to include or execute software such as file storage applications, database applications, email or messaging applications, web server applications, or the like, in addition to and/or in conjunction with the computer program and/or software described elsewhere herein The communication element of the server 150 generally allows communication with external systems or devices (e.g., with the mobile device 130). As such, embodiments of the communication element of the server 150 may be similar to or the same as the embodiments of the communication element 145 described above for the mobile device 130. Similarly, the embodiments of the memory element and the processing element of the server 150 may be similar to or the same as the embodiments of the memory element 146 and the processing element 147 described above for the mobile device 130.

The communications network 152 may generally allow communication between the mobile device 130 and the server 150 via wireless communication or data transmission over one or more radio links or wireless communication channels. The communications network 152 may also provide communication between the mobile device 130 and components of the spreader 100 (e.g., various data sensors described in more detail below). The communications network 152 may include local area networks, metro area networks, wide area networks, cloud networks, the Internet, cellular networks, plain old telephone service (POTS) networks, and the like, or combinations thereof. The communications network 152 may be wired, wireless, or combinations thereof and may include components such as modems, gateways, switches, routers, hubs, access points, repeaters, towers, and the like. The spreader 100 and the mobile device 130 will generally connect to the communications network 152 wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth®, or combinations thereof.

Returning to the above description of the user interacting with the mobile device 130, the user may select, via the mobile device 130, a type of spreader 100 that will be used to spread particulate material onto the surface. Such selection may be made by the user entering the spreader make/model/year into a free-form text box or by selecting the spreader 100 make/model/year from one or more pull-down menus. Upon selecting a spreader 100, the mobile device 130 may then obtain information relevant to the selected spreader 100 by accessing such information on the memory elements 146 and/or on the server 150. Such obtained information may include standard operational attributes, including information relevant to the standard application rates and coverage areas for the selected spreader 100. As used herein application rate may be in the form of: a number of seeds per unit time (e.g., 1000 seeds per minute), a weight of seed per unit time (e.g., 2 pounds per minute), application density (e.g., 1000 seeds per square meter), or the like. The coverage area may be in the form of: a total surface area over which particulate material is being spread (e.g., 100 square feet), a total width of the surface area over which particulate material is being spread (e.g., 20 feet), a half width of the surface area over which particulate material is being spread (e.g., 10 feet on either side of the spreader 100), or the like.

As was noted previously, however, operational attributes, including application rates and coverage area, may also be dependent on a type of particulate material being applied. As such, the mobile device 130 may be configured to obtain information related to various types of particulate material. Such information may be stored on the memory element 146 of the mobile device 130 and/or on the server 150. Regardless, the user may interact with the mobile device 130 so as to select the type of particulate material that will be spread by the selected spreader 100 onto the surface. Such selection may be made by the user entering the particulate material manufacturer/product into a free-form text box or by selecting the particulate material manufacturer/product from one or more pull-down menus. Upon selecting a particulate material, the mobile device 130 may then obtain information relevant to the selected particulate material by accessing such information on the memory elements 146 and/or on the server 150. Such obtained information may include standard operational attributes, including information relevant to the standard application rates and coverage area for the selected particulate material (perhaps as applied by the selected spreader 100). In some embodiments, the mobile device 130 may obtain information relevant to standard application rates and coverage areas by analyzing both the selected spreader and the selected particulate material.

Figure 9:
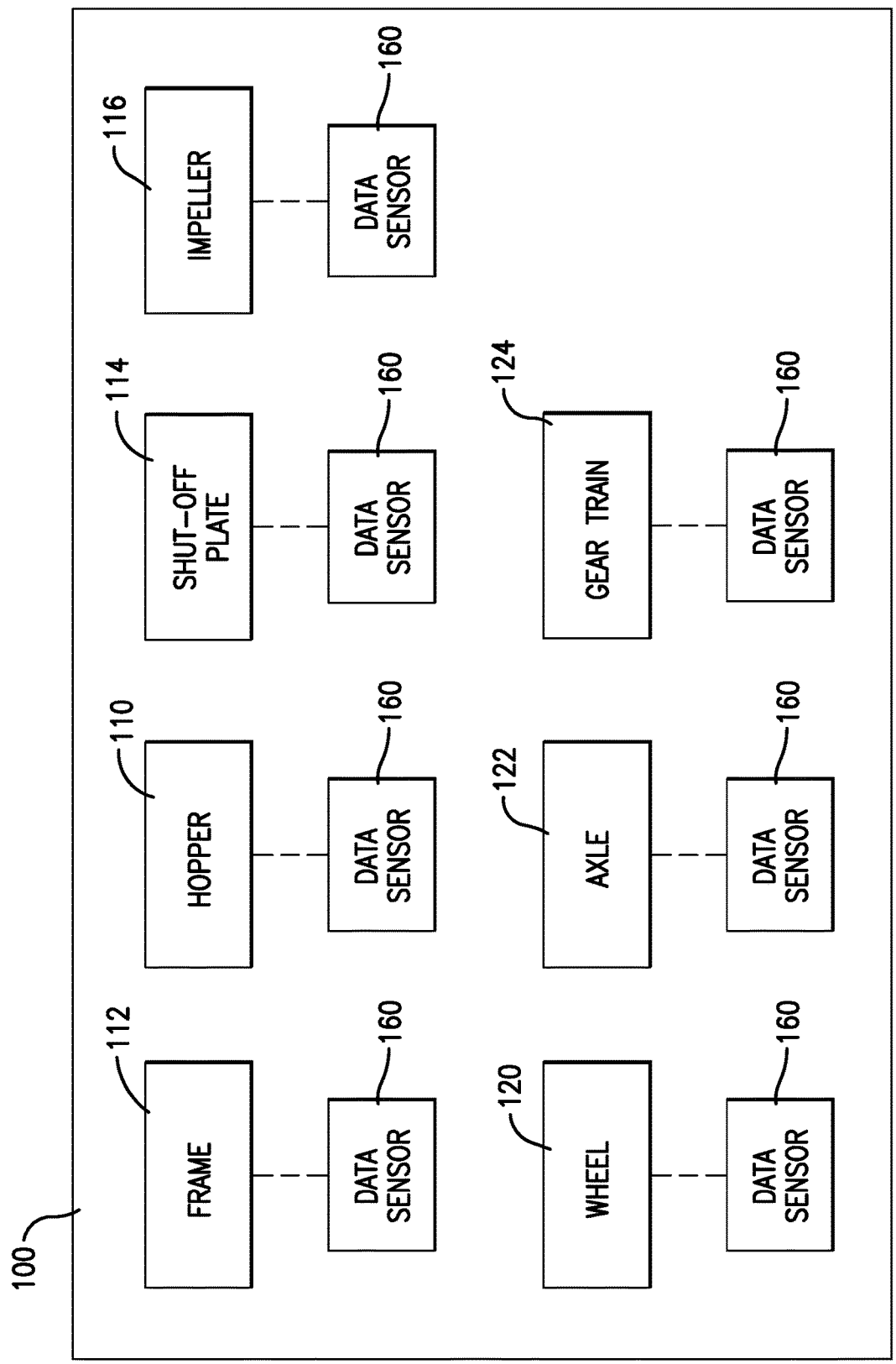
FIG. 9 is a schematic view of the spreader from FIGS. 1-6.

Accurate operational attributes, including application rates and coverage areas, may require information beyond simply identifying the spreader 100 and the particulate material being used. For instance, application rates and coverage areas may depend on a travel speed of the spreader 100 (e.g., how fast the user is pushing the spreader 100) and/or whether and to what extent the shut-off plates 114 are open (e.g., so as to allow particulate material to fall through the outlet openings of the hopper 110 and onto the impellers 116). To obtain such additional information, in some embodiments, the spreader 100 may be configured to include one or more additional data sensors 160, as illustrated in the schematic illustration of the spreader 100 in FIG. 9. In some embodiments, the data sensors 160 of the spreader 160 may include certain of the same data sensors 143 discussed previously with respect to the mobile device 130 (e.g., accelerometers, GPS receivers, etc.).

In more detail, the spreader 100 may include one or more data sensors 160 that are configured to measure (or to provide an indication of) a position, speed, and/or acceleration of the spreader 100. Such data sensors 160 may, for example, be connected to or otherwise associated with the frame 112, the wheels 120, the axle 122, and/or the gear train 124 of the spreader 100. The data sensors 160 that measure a position, speed, and/or acceleration of the spreader 100 may include accelerometers or location-determining elements (e.g., a GPS receiver). For example, the frame 112 of the spreader 100 may include or may be associated with an accelerometer for measuring acceleration experienced by the spreader 100. A derivative of the acceleration of the spreader 100 may be computed to obtain a velocity of the spreader 100. A second derivative of the acceleration of the spreader 100 may be computed to obtain a distance travelled by the spreader 100, and thus a position of the spreader 100. Alternatively, the frame 112 of the spreader 100 may include or may be associated with a GPS receiver that can obtain terrestrial location information of the spreader 100 based on satellite. Sequential location information obtained by the GPS receiver may be used to also compute speed and acceleration information for the spreader 100.

In further alternatives, other data sensors 160 may be used to obtain speed information for the spreader 100. For example, one or more of the wheels 120, the axle 122, and/or the gear train 124 may be associated with data sensors 160 in the form of rotations per minute (RPM) sensors. Such RPM sensors may comprise one or more gyroscopes and/or accelerometers that are configured to measure rates of rotation. As such, the RPM sensors may be connected to or otherwise associated with one or more of the wheels 120, the axle 122, and/or the gear train 124 to measure a rate of rotation of the one or more of the wheels 120, the axle 122, and/or the gear train 124. Using the measured rotation rates of the one or more of the wheels 120, the axle 122, and/or the gear train 124 along with a pre-defined outer circumference of the wheels 120 (and/or tires placed on the wheels 120), a speed of the spreader 100 can be determined by taking a product of the measured rotation rate and the outer circumference of the wheels 120. The outer circumference of the wheels 120 may be included as part of the spreader 100 information stored in the memory element 146 of the mobile phone and/or in the memory elements of the server 150. It should be understood, however, that other types of sensors (apart from RPM sensors) may be used to obtain rotational information of the wheels 120, the axle 122, and/or the gear train 124. For example, rotary encoders may alternatively be used.

In some embodiments, the position, speed, and/or acceleration data obtained by the data sensors 160 may be transmitted over the communications network 152 from the spreader 100 to the mobile device 130 for further analysis, such as for managing and/or monitoring the operational attributes, including application rates and coverage areas, of the spreader 100 spreading particulate material, as will be discussed in more detail below. As was previously described, the communications network 152 may be wired or wireless. As such, for instance, the data sensors 160 of the spreader 100 may be configured to transmit data (e.g., speed-related data of the spreader 100) to the mobile device 130 wirelessly (e.g., via Bluetooth) for further analysis. For instance, the data sensors 160 (e.g., RPM sensors) may obtain information indicative of a speed of travel of the spreader (e.g., a rotational rate of the axle 122) and transmit such information to the mobile device 130. The mobile device 130 may compute the actual travel speed of the spreader using the information received from the data sensors 160 along with an outer circumference of the wheels 120 of the spreader.

In some embodiments, the data sensors 160 may each include their own internal batteries for providing necessary power operate the data sensors 160 in the manners described herein. In some alternative embodiments, the spreader 100 may include its own battery for providing power to the data sensors 160, as necessary. Regardless, the data sensors 160 may be configured to continuously transmit data to the mobile device 130, such that the mobile device 130 can obtain and/or generate operational attributes of the spreader 100 in real-time.

In addition to the above-described data sensors 160, which can be used to obtain data relevant to the position, speed, and/or acceleration of the spreader 100, embodiment may provide for the spreader 100 to include other types of data sensors 160 that can collect and provide data relevant to managing and/or monitoring operational attributes of the spreader 100. For instance, the hopper 110 may include one or more data sensors 160, such as weight sensors, optical sensors, etc., configured to measure an amount of particulate material being held within the hopper 110. Each of the shutoff-plates 114 may be associated with a data sensor 160, such as a displacement sensor, an optical sensor, a rotary encoder, etc., for measuring a position of the shutoff-plate 114. As such, the data sensors 160 may obtain information as to whether the shut-off plates 114 are completely open (i.e., so as to not restrict the flow of particulate material through the outlet openings of the hopper 110), completely closed (i.e., so as to completely restrict the flow of particulate material through the outlet openings of the hopper 110), or at some position in between (i.e., so as to partly restrict the flow of particulate material through the outlet openings of the hopper 110). Furthermore, each of the impellers 116 may be associated with a data sensor 160, such as an RPM sensor, a rotary encoder, etc., for measuring a rotational rate of the impellers 116. Such data sensors 160 may, transmit their obtained data wirelessly back to the mobile device 130 as was previously described, such that the mobile device 130 can use the data to manage and monitor operational attributes, e.g., application rates and coverage areas, of the spreader 100.

Figure 10:
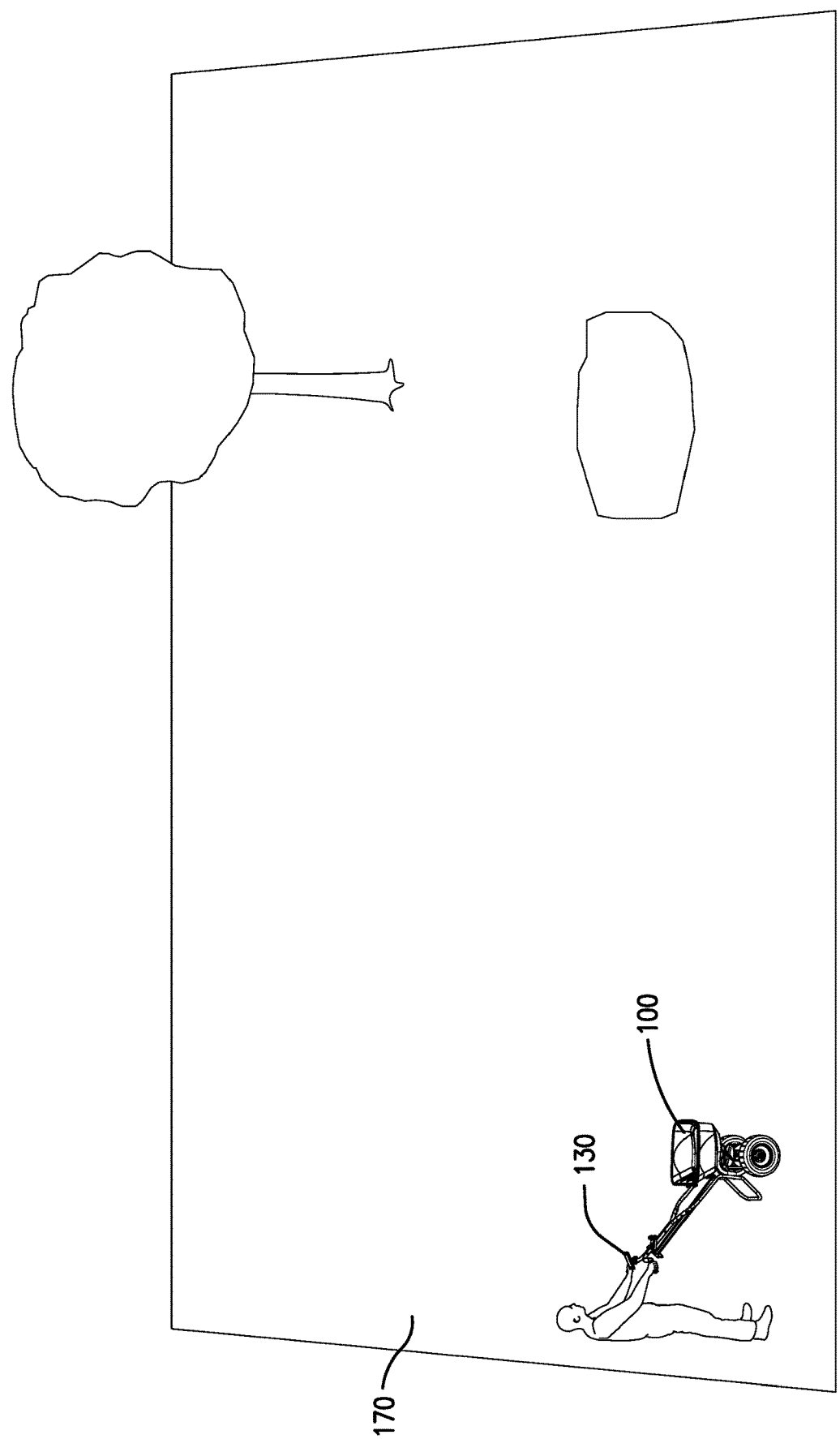
FIG. 10 is an illustration of a surface over which a spreader is spreading particulate material.

Turning to the operation of the spreader in more detail, a user may wish to apply particulate material (e.g., fertilizer) to a surface, such as the ground surface 170 illustrated in FIG. 10. During such application of particulate material, it is beneficial if the user can manage and monitor, in real-time, one or more operational attributes of the spreader 100, such as the application rates and coverage area of the particulate material being spread by the spreader 100. To accomplish this, embodiments provide for the user to associate the user's mobile device 130 with the spreader 100. For example, the user may attach the mobile device 130 to the mounting assembly 132 positioned on the handle 118 of the spreader 100. In addition, the mobile device 130 may communicatively couple (e.g., wirelessly "pair") with one or more data sensors 160 associated with the spreader 100, such as via Bluetooth connection. In such a configuration, the user can interact with the mobile device 130 (e.g., via the user interface 141) and view the display 140 of the mobile device 130 while operating the spreader 100 to distribute particulate material over the ground surface 170.

As was noted previously, the mobile device 130 can be used to manage and/or monitor the spreading of particulate material onto the ground surface 170 by providing information to the user that is relevant to the spreading (e.g., operational attributed such as application rates and coverage area). Operational attributes may be dependent, at least partly, on the type of spreader 100 used and the type of particulate material being spread. As such, the user can select the type of spreader 100 to be used and the type of particulate material being spread into the mobile device 130. Based on the selected type of spreader 100 and type of particulate material, the mobile device 130 may provide various standard operational attributes, such as a standard application rate and a standard coverage area of the selected spreader 100 distributing the selected particulate material onto the ground surface 170. Such a standard application rate and coverage area may be based on the selected spreader 100 spreading the selected particulate material with the selected spreader 100 traveling at a standard speed (e.g., 2 miles per hour) and with the selected spreader's 100 shut-off plate 114 being standard open/closed position. In some embodiments, the mobile device 130 may be configured to present instructions to the user on how the settings of the spreader should be configured to provide for the standard application rate and coverage area. The mobile device 130 may also present instructions on how the user can adjust the settings of the spreader (e.g., the position of the shut-off plates 114) so as to increase or decrease the application rate and coverage area from the standard application rate and coverage area.

In some embodiments, the user may be able to manually adjust the standard application rate and coverage area originally determined by the mobile device 130. For example, the user may be able to adjust the actual application rate of the spreader 100 by adjusting the shut-off plates 114 of the spreader 100. For instance, if the user wishes to reduce the application rate, the user can partly close the shut-off plates 114 so as to restrict the passage of particulate material through the outlet openings of the hopper 110. To accommodate for such change on the mobile device 130, the user may provide an indication of such change into the mobile device 130 so that the mobile device 130 can present the correct application rate. Similarly, if the use intends to push the spreader 100 faster or slower than the standard speed, then the user may also provide an indication of such change into the mobile device 130 so that the mobile device 130 can present the correct coverage area.

The standard operational attributes, such as standard application rate and standard coverage area, may be presented to the user of the spreader 100, via the mobile device 130, so as to provide standard, baseline information regarding spreading operations. However, as was noted previously, actual, real-time operational attributes can be dependent on various factors, such as the actual, real-time speed of the spreader 100. To account for such other factors, embodiments provide for the mobile device 130 to be in communication with one or more data sensors 160 associated with the spreader 100.

As an illustrative example, it was previously described that particulate material is spread from the spreader 100 onto the ground surface 170 via rotation of the impellers 116. However, because the impellers 116 are generally driven (directly or indirectly) by the wheels 120, the axle 122, and/or the gear train 124, the rotational rate of the impellers 116 may be dependent on the speed of the spreader 100. To account for the effects of the spreader's 100 travel speed, data sensors 160 associated with the wheels 120, the axle 122, and/or the gear train 124 may transmit real-time speed information to the mobile device 130 so that the mobile device 130 can determine and provide accurate, real-time operational attributes of the spreader 100, including application rates and coverage areas. As such, the data sensors 160 that provide speed-related information of the spreader 100 may be considered "speed sensors." In some embodiment, the data sensors 160 may be RPM sensors that may obtain real-time data related to the rotational rate of the wheels 120, the axle 122, and/or the gear train 124 and transmit such data to the mobile device 130. In such embodiments, the mobile device 130 may determine the real-time speed of the spreader 100 by combining (e.g., via multiplication) the measured real-time rotational rate with the outer circumference of the wheels 120, as was previously described.

Figure 11:
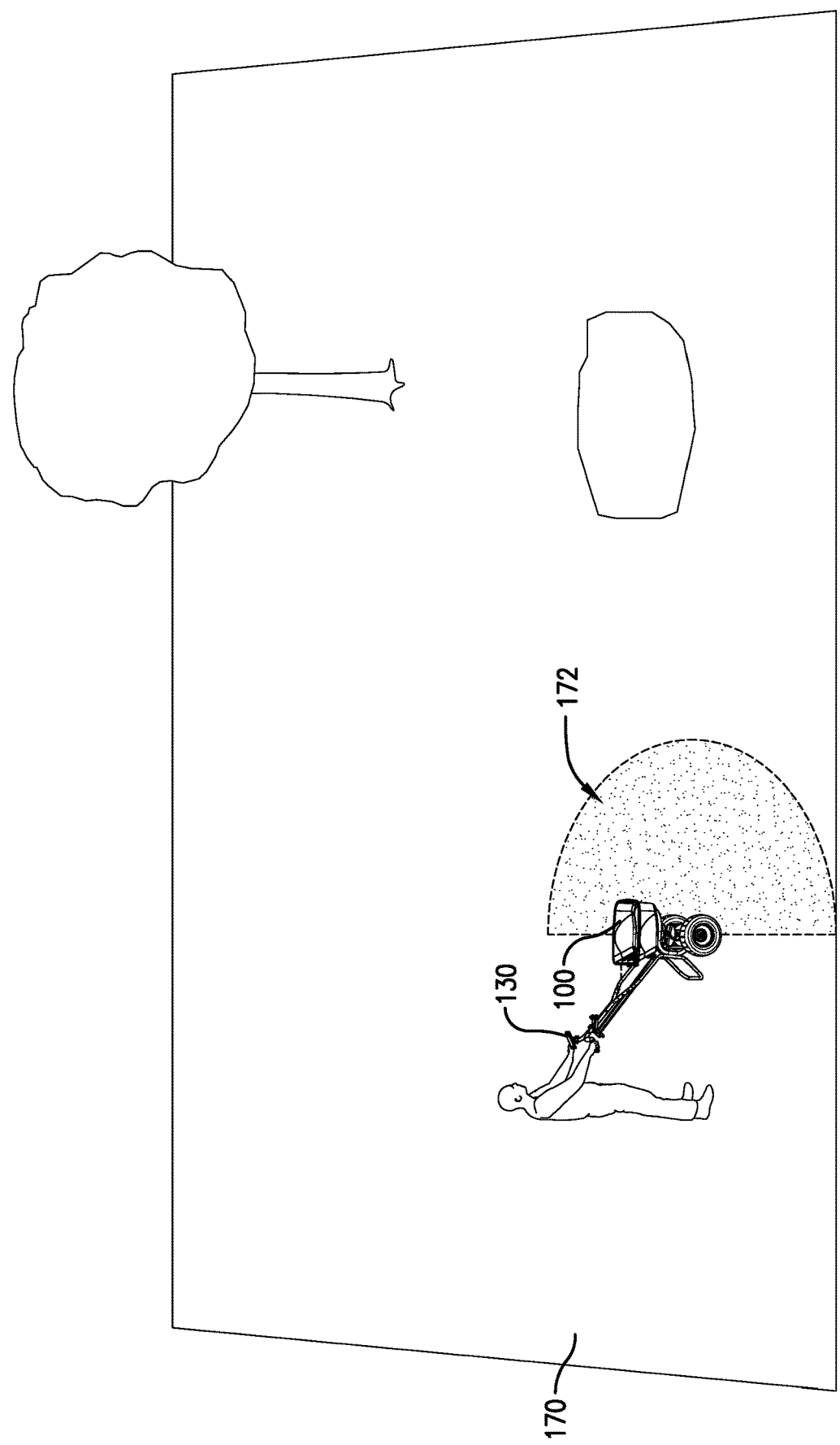
FIG. 11 is another illustration of a surface over which a spreader is spreading particulate material, particularly showing a coverage area of the particulate material being spread onto the surface.

The mobile device 130 may present the determined operational attributes of the spreader 100, including the application rate and coverage area, to the user in various formats. For example, the mobile device 130 may present on the display 140 numerical values for each of the application rate and coverage area. Alternatively, the mobile device 130 may present the application rate and/or the coverage area graphically. For example, as illustrated in FIG. 11, the mobile device 130 may present a graphical user interface (GUI) in the form of a graphical representation of the ground surface 170 (e.g., a graphical map) over which the spreader 100 is spreading particulate material. The graphical map may be generated by accessing various mapping programs (e.g., Google Maps™) available on the mobile device 130. Alternatively, the user may generate a graphical map by traveling around a boundary of the ground surface 170 with the spreader 100 while tracking the user's location with a location-determining element associated with the spreader 100 (e.g., a data sensor 160 in the form of a GPS receiver) or associated with the mobile device 130 (e.g., the location-determining element 142).

Regardless, the mobile device 130 may generate a GUI that includes a graphical representation of the spreader 100 overlaid on the graphical map, as shown in FIG. 11. The position of the graphical representation of the spreader 100 on the graphical map may be updated in real time via the location-determining element associated with the spreader 100 (e.g., a data sensor 160 in the form of a GPS receiver) or associated with the mobile device 130 (e.g., the location determining element 142). In addition, the mobile device 130 may present an accurate, real-time graphical presentation of the coverage area (see, e.g., coverage area 172). Specifically, the mobile device 130 may use the data related to the selected spreader 100, the data related to the selected particulate material, and the real-time speed of the spreader (as obtained by one or more of the data sensors 160 of the spreader 100) to determine an accurate, real-time coverage area 172, which can be displayed on the GUI as shown in FIG. 11. The displayed coverage area 172 may be presented in an accurate format so as to provide an indication to the user as to the actual, real-time coverage area (i.e., the area within the surface 170 over which particulate material is being spread) being generated by the spreader 100 as the spreader travels over and spreads particulate material onto the ground surface 170. As the spreader 100 decreases in speed, the displayed overage area 172 will decrease in size, whereas as the spreader 100 increases in speed, the displayed coverage area will increase in size. Such decreasing and increasing of coverage area 172 size/width being due to the impeller 116 spinning respectively slower and faster as the speed of the spreader 100 is changed. As such, the user can monitor, in real-time, the actual coverage area 172 being generated by the spreader 100, such that the user can know whether the speed of travel of the spreader is appropriate, or if the user should speed up or slow down (i.e., so as to respectively increase or decrease the coverage area 172).

The GUI generated by the mobile device 130 may also present operational attributes in the form of real-time application rates of the spreader 100. Such application rates may be presented numerically or graphically. For instance, the application rates may be presented in the form of a colored-coded alert (e.g., yellow—indicative of a slow application rate, green—indicative of a standard application rate, or red—indicative of a fast application rate), a bar gauge/dial, a speedometer-type gauge/dial, or the like. Alternatively, or in addition, when the application rate is presented in the form of an application density applied to the ground surface 170, embodiments may provide for such an application rate to be presented as a fill gradient of the coverage area 172.

In some embodiments, operational attributes of the spreader 100, including the application rate and/or the coverage area 172, may be based, at least partly, on data collected with a data sensor 160 associated with the impellers 116. For instance, instead of (or in addition to) speed data received from data sensors 160 associated with the wheels 120, the axle 122, and/or the gear train 124, the mobile device 130 may obtain real-time rotational data from RPM sensors associated with the impellers 116. Such rotational data may be indicative of the real-time application rate and/or coverage area of the spreader 100. As such, the mobile device 130 may use such rotational data of the impellers 116 to generate real-time application rates and/or a real-time coverage area 172 for display to the user. In embodiments in which the spreader 100 includes multiple impellers 116, each impeller 116 may be associated with an individual RPM sensor. As such, the mobile device 130 can generate a coverage area 172 for display that is indicative of the coverage area 172 generated by each impeller 116 spreading particulate material. For example, if one impeller 116 is not active (such that the impeller is only spreading particulate material on one side of the spreader 100), then the mobile device 130 will only generate a coverage area 172 for display that indicates the coverage area only extending from one side of the spreader 100.

In some additional embodiments of the spreader, the impellers 116 may not be driven by the wheels 120, the axle 122, and/or the gear train 124. For instance, the impellers 116 may be independently driven by one or more electric motors. In such case, certain operational attributes of the spreader 100, such as the application rate and/or the coverage area, will not be dependent on the travel speed of the spreader 100, but on the rotation rate of the impellers 116. As such, the mobile device 130 may be required to obtain real-time rotational data from the data sensors 160 associated with the impellers 116 (in place of speed data associated with the wheels 120, the axle 122, and/or the gear train 124) to determine and present real-time application rates and/or the coverage areas of the spreader 100.

Embodiments may present other real-time information related to the user's use of the spreader 100. For example, in embodiments of the spreader 100 that include a data sensor 160 in the form of a fill sensor associated with the hopper 110, the data sensor 160 may send data to the mobile device 130 such that the mobile device 130 may be configured to present to the user a real-time fill amount or weight of particular material being held in the hopper 110. In addition, data sensors 160 (such as position sensors) associated with the shut-off plates 114 may send data to the mobile device 130 such that the mobile device 130 may be configured to present to the user a real-time position information related to the position of the shut-off plates 114. In some embodiments, the position information of the shut-off plates 114 may be used to determine application rates and/or coverage areas for the spreader 100. Furthermore, it should be understood that in some embodiments, the mobile device 130 may use certain of its own internal data sensors 143 in place of (or in addition to) the data sensors 160 of the spreader 100 to determine operational attributes of the spreader 100, such as application rates and/or coverage areas. For example, the mobile device 130 may use an internal location-determining element 142 (e.g., GPS receiver) and/or data sensors 143 (e.g., accelerometers) to determine a position, speed, and/or acceleration of the spreader 100 whenever the mobile device 130 is secured to the spreader 100.

Embodiments provide for all of the data collected and analyzed by the mobile device 130 to be stored for future use and analysis. For example, each time the user uses the spreader 100 to apply particulate material to a surface, the mobile device 130 may store the total amount of particulate material applied to the surface and the date/time of application. As such, the user can review each previous application to determine if appropriate amounts have been historically applied to the surface. In some embodiments, the mobile device 130 may transmit all of such data to the server 150 for storage and for future analysis.

Figure 12:
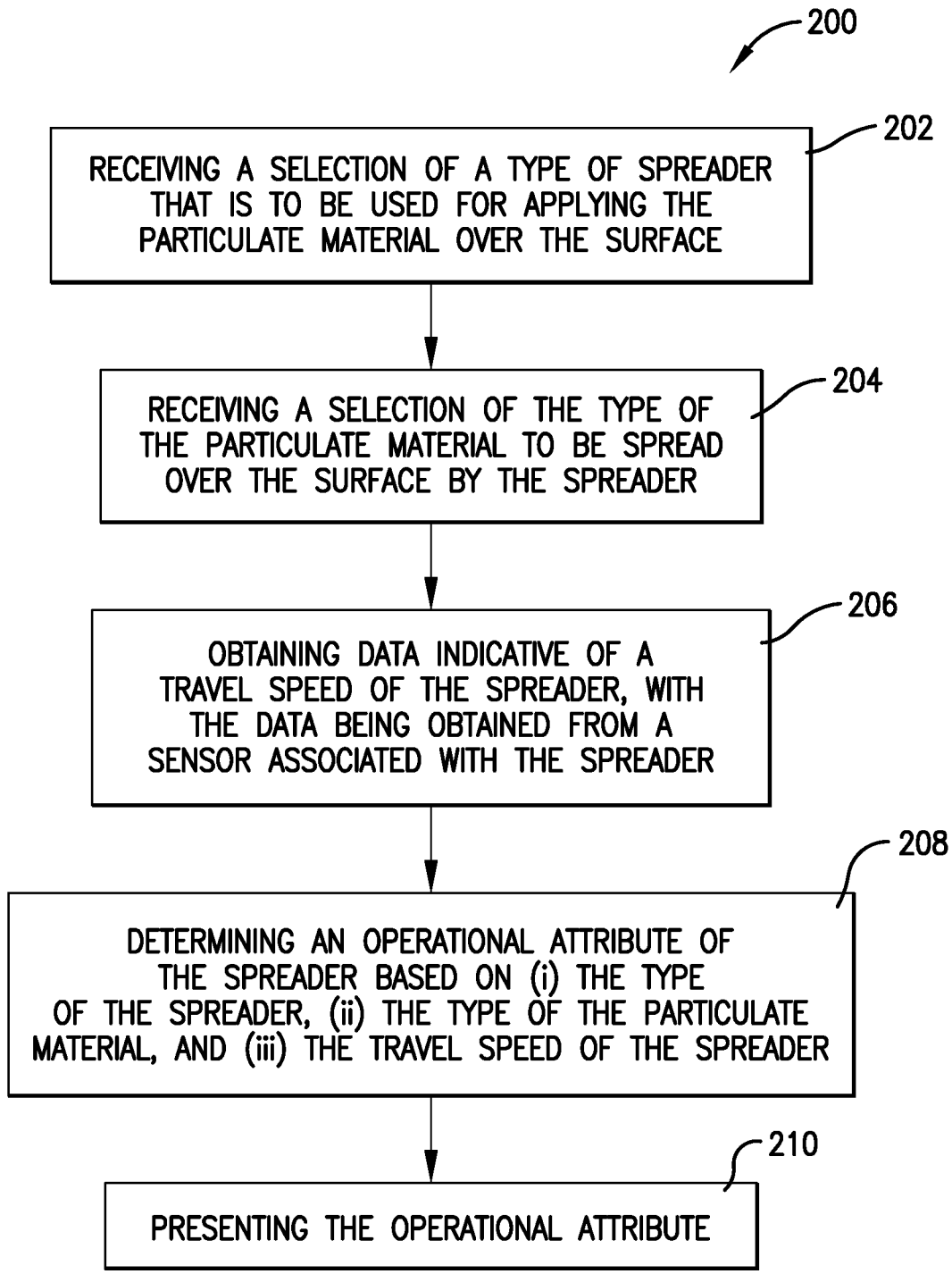
FIG. 12 is a flowchart illustrating a method for managing the spreading of particulate material over a surface according to embodiments of the present invention.

In view of the above, embodiments may include a method 200, as illustrated in FIG. 12 for managing and/or monitoring the application of particulate material over a surface by a spreader 100. The method 200 may include a Step 202 of receiving a selection of a type of spreader 100 that is to be used for applying the particulate material over the surface. A Step 204 may include receiving a selection of the type of the particulate material to be spread over the surface by the spreader 100. Step 206 may include obtaining data indicative of a travel speed of the spreader, with the data being obtained from a sensor 160 associated with the spreader 100. A Step 208 may include determining an operational attribute of the spreader 100 based on (i) the type of the spreader 100, (ii) the type of the particulate material, and (ii) the travel speed of the spreader 100. A further step 210 includes presenting the operational attribute, e.g., via the mobile device 130.

Although the invention has been described with reference to the one or more embodiments illustrated in the figures, it is understood that equivalents may be employed and substitutions made herein without departing from the scope of the invention as recited in the claims. For example, FIG. 13 illustrates an embodiment of the present invention in which a spreader 200 and a mobile device 130 are incorporated for use with a work vehicle. Such a work vehicle may comprise a riding mower (e.g., a zero-turn mower), an all-terrain vehicle (ATV), a utility task vehicle (UTV), golf cart, or the like. The spreader 200 may be integrated with the work vehicle via a support element, such as a connection assembly/bracket, a hitch, or the like. In some embodiments, the spreader 200 may comprise its own axle and wheels (such as axle 122 and wheels 120 previously described) so as to support itself on the ground as the spreader 200 is pulled by the work vehicle. Alternatively, spreader may be partially or fully supported on the work vehicle, such that the spreader 200 does not require its own axle and wheels. In such embodiments, the impellers of the spreader 200 may be powered by the work vehicle (e.g., via a power take-off (PTO) associated with the work vehicle) or by an independent power source (e.g., one or more electric motors that may receive electric power from the work vehicle). Regardless, the mobile device 130 may be configured to present operational attributes of the spreader 200 as the spreader 200 is being transported across the ground surface by the work vehicle. To aid in use of the mobile device 130 while a user is operating the work vehicle, the mobile device 130 may be configured to be secured to a portion of the work vehicle, such as on a dashboard or control panel of the work vehicle.

In more detail, the mobile device 130 may be in communication with one or more data sensors 160 configured to obtain information from the spreader 200 and/or from the work vehicle. For instance, each of the operational attributes (e.g., travel speed, impeller speed, etc.) of the spreader 200 may be obtained from data sensors 160 of the spreader 200, as previously described. In addition, a real-time travel speed of the spreader 200 may be obtained from the work vehicle with which the spreader 200 is integrated. For example, the mobile device 130 may obtain certain information from data sensors incorporated with the work vehicle. Such data sensors may include, for instance, speed sensors in the form of RPM sensors associated with the engine, PTO, axles, and/or wheels of the work vehicle. Alternatively, the data sensors may be speed sensors associated with the speedometer of the work vehicle. Alternatively, the data sensors may be speed or position sensors, in the form of GPS sensors associated with the work vehicle. The mobile device 130 may be in communication with such data sensors. As such, the mobile device 130 is configured to generate operational attributes of the spreader 200 by obtaining and analyzing information received from the one or more data sensors that are incorporated with the spreader 200, with the mobile device 130, and/or with the work vehicle.

As illustrated in FIG. 13, for example, the mobile device 130 may present a graphical user interface (GUI) in the form of a graphical representation of a ground surface 270 (e.g., a graphical map) over which the spreader 200, being propelled by the work vehicle, is spreading particulate material. The mobile device 130 may generate a GUI that includes a graphical representation of the spreader 200 overlaid, in conjunction with the work vehicle, on the graphical map, as shown in FIG. 13. The position of the graphical representation of the spreader 200 and/or the work vehicle on the graphical map may be updated in real time via the location-determining element associated with the spreader 200 (e.g., a data sensor 160 in the form of a GPS receiver), associated with the mobile device 130 (e.g., the location determining element 142), and/or associated with the work vehicle (e.g., data sensors).

In addition, the mobile device 130 may present an accurate, real-time graphical presentation of the coverage area (see, e.g., coverage area 272). Specifically, the mobile device 130 may use the data related to the selected spreader 200, the data related to the selected particulate material, and the real-time speed of the spreader 200 (as obtained by one or more of the data sensors 160 of the spreader 200 and/or the work vehicle) to determine an accurate, real-time coverage area 272, which can be displayed on the GUI as shown in FIG. 13. The displayed coverage area 272 may be presented in an accurate format so as to provide an indication to the user as to the actual, real-time coverage area (i.e., the area within the surface 270 over which particulate material is being spread) being generated by the spreader 200 as the spreader 200 is pulled by the work vehicle over the ground surface 270 to spread particulate material onto the ground surface 270.

In embodiments, in which the impellers of the spreader 200 are powered by the wheels of the spreader 200, as the spreader 200 decreases in speed, the displayed overage area 272 will decrease in size, whereas as the spreader 200 increases in speed, the displayed coverage area will increase in size. Such decreasing and increasing of coverage area 272 size/width will be due to the impeller spinning respectively slower and faster as the speed of the spreader 200 is changed. Alternatively, such as when the spreader 200 does not have its own wheels but is partially or fully supported by the work vehicle (i.e., in the form of a work vehicle mounted spreader), the rate of rotation of the spreader's 200 impellers may be adjusted by the travel speed or engine speed of the work vehicle (e.g., via the rotation rate of the PTO or via rotation of the work vehicle's axles or wheels). Thus, data sensors associated with the work vehicle may be used to present information related to the coverage area 272 of particulate material being spread by the spreader 200, i.e., as the work vehicle decreases in speed, the displayed overage area 272 will decrease in size, whereas as work vehicle increases in speed, the displayed coverage area will increase in size. Thus, the data sensors associated with the work vehicle may be used by the mobile device 130 to update the real-time coverage area 272, speed, and position of the spreader 200 and/or of the work vehicle. As a result, the user can monitor, in real-time, the position and actual coverage area 272 of the spreader 200 and/or the work vehicle, such that the user can know whether the speed of travel of the spreader 200 and/or work vehicle is appropriate, or if the user should speed up or slow down (e.g., so as to respectively increase or decrease the coverage area 272).

In further embodiments, such as when the impellers of the spreader 200 are powered by an external power source (e.g., an electric motor), the rotation rate of the impellers may be manually set at a constant rate, such that the coverage area 272 is generally consistent. Nevertheless, the travel speed of the spreader 200 and/or the work vehicle can affect other operational attributes of the spreader, such as the number of seeds per unit time, a weight of seed per unit time, application density (e.g., 1000 seeds per square meter), or the like. Thus, the mobile device 130 may use information (e.g., real-time travel speed information) obtained from the data sensors of the work vehicle to generate and display operational attributes of the spreader 200 (in addition to the real-time position of the spreader 200 and/or work vehicle presented on the GUI of the mobile device 130).

Having thus described one or more embodiments of the invention, what is claimed as new and desired to be protected by Letters Patent includes the following:

1. A computer-implemented method for managing spreading of particulate material over a surface by a spreader, said method comprising the steps of:
   receiving, by a computer, a selection of a type of the spreader;
   receiving, by the computer, a selection of a type of the particulate material to be spread by the spreader;
   obtaining, by the computer, data indicative of a travel speed of the spreader, wherein the data is received from a sensor;
   determining, by a processor associated with the computer, a real-time coverage area of the spreader, wherein the real-time coverage area is a real-time area over which particulate material is being spread on the surface, wherein said determination is based on (i) the type of the spreader, (ii) the type of the particulate material, and (iii) the travel speed of the spreader; and
   presenting, by the computer, the real-time coverage area.

2. The method of claim 1, wherein the data indicative of the travel speed of the spreader is received in real time.

3. The method of claim 1, wherein the sensor comprises a rotations per minute (RPM) sensor associated with an axle of the spreader.

4. The method of claim 1, wherein the real-time coverage area is presented on a graphic display of a mobile device.

5. A non-transitory computer-readable media with a computer program stored thereon for managing spreading of particulate material over a surface by a spreader, wherein when executed by one or more processors said computer program instructs said one or more processors to perform the following steps:
   receive a selection of a type of the spreader;
   receive a selection of a type of the particulate material to be spread by the spreader;
   obtain data indicative of a travel speed of the spreader, wherein the data is obtained from a sensor;
   determine a real-time coverage area of the spreader, wherein the real-time coverage area is a real-time area over which particulate material is being spread on the surface, wherein said determination is based on (i) the type of the spreader, (ii) the type of the particulate material, and (iii) the travel speed of the spreader; and
   present the real-time coverage area.

6. The non-transitory computer-readable media of claim 5, wherein the sensor comprises a rotations per minute (RPM) sensor associated with an axle of the spreader.

7. The non-transitory computer-readable media of claim 5, wherein the real-time coverage area is presented on a graphic display of a mobile device.

\* \* \* \* \*